United States Patent
Adams et al.

(10) Patent No.: US 8,372,348 B2
(45) Date of Patent: Feb. 12, 2013

(54) APPARATUS AND METHOD FOR MIXING A CONCENTRATED WATER TREATMENT SOLUTION

(75) Inventors: Zachary Harris Adams, Marietta, GA (US); David W. Blanchette, Bristol, CT (US)

(73) Assignee: Arch Chemicals, Inc., Altanta, GA (US)

( * ) Notice: Subject to any disclaimer, the term of this patent is extended or adjusted under 35 U.S.C. 154(b) by 569 days.

(21) Appl. No.: 12/490,044

(22) Filed: Jun. 23, 2009

(65) Prior Publication Data
US 2009/0324747 A1 Dec. 31, 2009

Related U.S. Application Data

(60) Provisional application No. 61/076,989, filed on Jun. 23, 2009.

(51) Int. Cl.
*B01D 11/00* (2006.01)
(52) U.S. Cl. ........................... 422/261; 424/665
(58) Field of Classification Search ............... 422/261; 424/665
See application file for complete search history.

(56) References Cited

U.S. PATENT DOCUMENTS

| | | | |
|---|---|---|---|
| 4,253,950 | A | 3/1981 | Wojtowicz |
| 5,928,608 | A | 7/1999 | Levesque et al. |
| 6,022,480 | A | 2/2000 | Girvan et al. |
| 6,915,811 | B2 | 7/2005 | Blanchette et al. |
| 7,143,778 | B2 | 12/2006 | Blanchette et al. |

OTHER PUBLICATIONS

International Search Report in PCT/US09/48434.

*Primary Examiner* — Sean E Conley
(74) *Attorney, Agent, or Firm* — Lucas & Mercanti, LLP

(57) ABSTRACT

An apparatus includes a reservoir for holding a chemical solution, a pump and a discharge nozzle. The pump has an inlet and an outlet connected to the reservoir by inlet and discharge lines. The nozzle is disposed in a lower portion of the reservoir and discharges the solution toward the bottom of the reservoir; the nozzle has an inlet port connected to the pump discharge line through the sidewall of the reservoir. The pump inlet line is connected to a sidewall of the reservoir at a location below a normal surface level of the solution, and the pump discharge line is connected to the sidewall of the reservoir above that location. The reservoir, pump, pump inlet line, pump discharge line, nozzle inlet line and nozzle form a closed loop recirculation system effective to suspend insoluble material in the chemical solution.

18 Claims, 2 Drawing Sheets

APPARATUS AND METHOD FOR MIXING A CONCENTRATED WATER TREATMENT SOLUTION

CROSS-REFERENCE TO RELATED APPLICATIONS

This application claims the benefit of U.S. Provisional Application No. 61/076,989, filed Jun. 30, 2008.

FIELD OF THE DISCLOSURE

This disclosure relates to water treatment disinfection systems, particularly treatment systems in which calcium hypochlorite is dissolved to make an available chlorine solution, which is fed into the water system.

BACKGROUND OF THE DISCLOSURE

Calcium hypochlorite is a solid, dry chemical that when dissolved generates a hypochlorous acid solution that is then used for disinfection of water. Hypochlorous acid is commonly referred to as "available chlorine." Equipment for dissolving the calcium hypochlorite typically includes a water sprayer or erosion chamber that dissolves the calcium hypochlorite into an available chlorine solution that can then be pumped through a discharge line into a water main for disinfection. An example of such a water sprayer is described in U.S. Pat. No. 5,928,608, the entire disclosure of which is incorporated herein by reference. Such equipment is commonly called "feed equipment."

In a solution of calcium hypochlorite, material such as calcium carbonate, calcium hydroxide, and other insoluble material can rapidly precipitate out of the solution and solidify in the bottom of the feed equipment. In locations where the water chemistry is alkaline or contains silicates, a reaction with calcium in the water may cause precipitation of hard aggregate that is not easily suspended in the solution. Failure to mix the solution so as to suspend the particles of insoluble material inside the feed equipment results in plugging of the discharge line which results in failure of the equipment.

SUMMARY OF THE DISCLOSURE

According to a first aspect of the disclosure, an apparatus is provided for suspending insoluble material in a chemical solution. The apparatus includes a reservoir for holding the chemical solution, a pump for circulating the chemical solution, and a discharge nozzle for mixing. The reservoir has an upper portion, a lower portion, a bottom and a sidewall. The pump has an inlet and an outlet connected to the reservoir by inlet and discharge lines. The discharge nozzle is disposed in the lower portion of the reservoir and discharges the solution toward the bottom of the reservoir; the nozzle has an inlet port connected by a nozzle inlet line to the pump discharge line through the sidewall of the reservoir. The pump inlet line is connected to the sidewall of the reservoir at a location below a normal surface level of the solution, and the pump discharge line is connected to the sidewall of the reservoir above that location. The reservoir, pump, pump inlet line, pump discharge line, nozzle inlet line and nozzle form a closed loop recirculation system effective to suspend insoluble material in the chemical solution.

According to a second aspect of the disclosure, a method is provided including the steps of forming a chemical solution in a reservoir; pumping the chemical solution from the reservoir through a pump inlet line and back to the reservoir through a pump discharge line; and discharging the solution toward a bottom of the reservoir through a discharge nozzle. The discharge nozzle has an inlet port connected by a nozzle inlet line to the pump discharge line through a sidewall of the reservoir. The chemical solution is thus recirculated in a closed loop to suspend insoluble material in the chemical solution.

The foregoing has outlined, rather broadly, the preferred features of the present disclosure so that those skilled in the art may better understand the detailed description of the disclosure that follows. Additional features of the disclosure will be described hereinafter that form the subject of the claims of the disclosure. Those skilled in the art should appreciate that they can readily use the disclosed conception and specific embodiment as a basis for designing or modifying other structures for carrying out the same purposes of the present disclosure and that such other structures do not depart from the spirit and scope of the disclosure in its broadest form.

DETAILED DESCRIPTION

Figure 1:
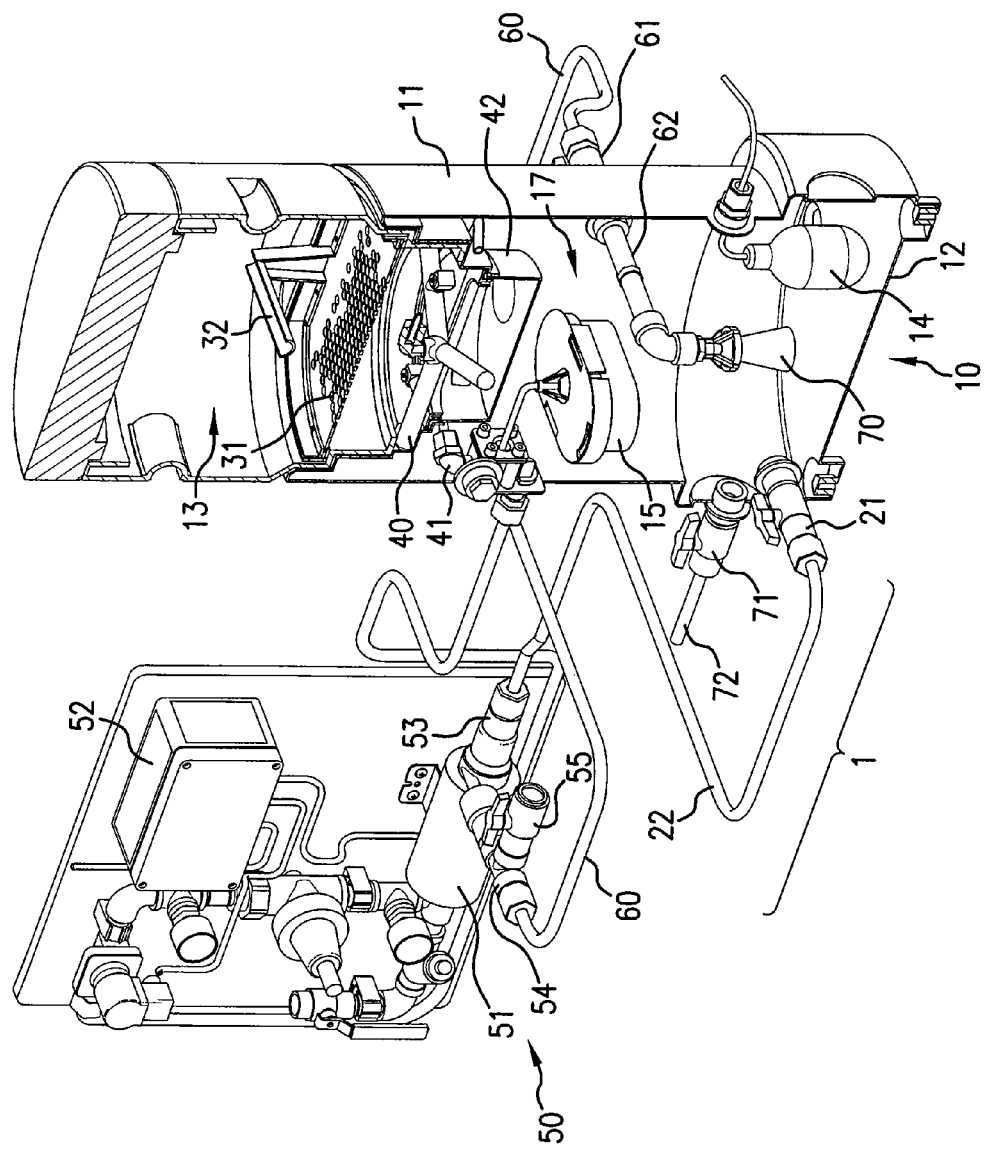
FIG. 1 is a schematic illustration of a mixing system for a calcium hypochlorite solution, in accordance with an embodiment of the disclosure.

In accordance with an embodiment of the disclosure, a mixing system 1, shown in FIG. 1, recirculates a solution in a closed loop on the calcium hypochlorite feed equipment. System 1 includes a pump assembly 50 with a small, high flow, low head centrifugal pump 51, in combination with a solution reservoir 10 which includes a mixing discharge nozzle 70. The centrifugal pump draws solution from the side of the reservoir near the bottom thereof, and circulates and discharges the solution back into the solution reservoir at a higher elevation.

As shown in FIG. 1, reservoir 10 has a sidewall 11 and a bottom 12. Solid chemical product (e.g. calcium hypochlorite tablets or briquettes) is dissolved in the upper portion 13 of the reservoir, and the solution is stored in the lower portion 17. The level of the solution in the lower portion is monitored and controlled using an electronic float switch 14 and a mechanical float valve 15. A grid 31 (including a handle 32) for holding the chemical product is installed in the upper portion of the reservoir. In this embodiment, water is sprayed upward onto the chemical product through the perforations in the grid from spray tree 40. The spray tree is supplied with water from supply line 41. As the chemical product dissolves, a concentrated solution drops down through the grid into a cup 42 having a spout formed therein, and thence into the bottom portion 17 of the reservoir 10.

An outlet valve 21 is installed in the sidewall 11 of the reservoir, below the normal surface level of the solution in the lower portion 17 of the reservoir. (In the cutaway view of FIG. 1, the portion of the sidewall receiving the valve is not shown.) As shown in FIG. 1, valve 21 is typically a ball valve normally in the open position. A line 22 leading from valve 21 connects to the inlet 53 of pump 51. In this embodiment, pump 51 is driven by an electric motor having a power supply 52. Pump 51 has a discharge outlet 54; a line 60 leads from outlet 54 back to reservoir 10. A bleed valve 55 is located at the pump discharge; valve 55 is typically a ball valve normally in the closed position.

Pump discharge line 60, returning to the reservoir, connects to inlet valve 61 (partially shown in FIG. 1), installed in the sidewall 11 of the reservoir above the normal surface level of the solution. Valve 61 is typically a ball valve normally in the open position. A nozzle inlet line 62 in the interior of the reservoir leads from valve 61 through the sidewall to approximately the vertical centerline of the reservoir. Line 62 connects with vertically oriented mixing discharge nozzle 70 (e.g. a "Tank Mixing Eductor" from Spraying Systems Co., Wheaton, Ill.).

Figure 2:
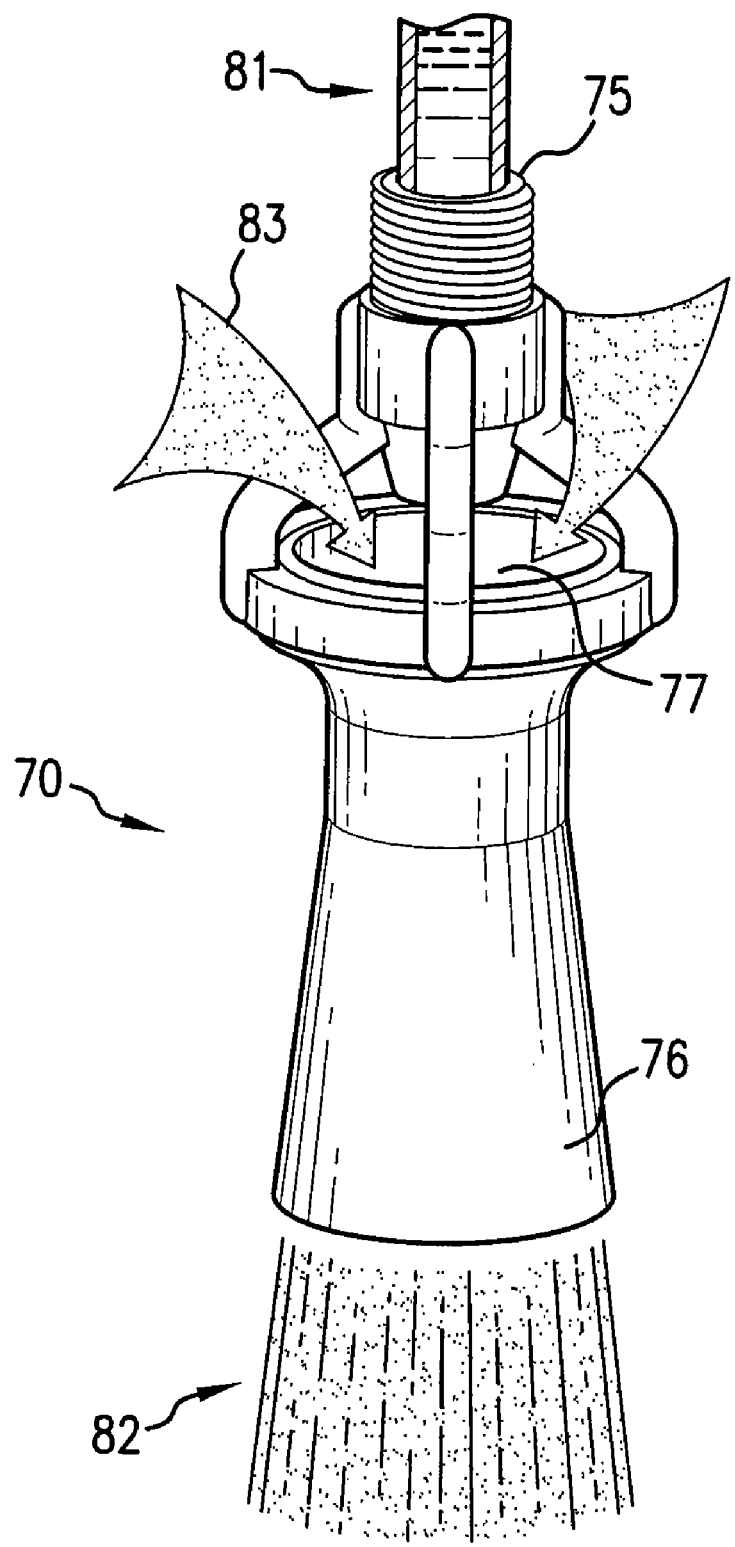
FIG. 2 shows details of the mixing nozzle used in the system of FIG. 1, schematically illustrating liquid flow into and through the nozzle.

Discharge nozzle 70 discharges the pumped solution toward the bottom surface 12 of the reservoir. The solution is agitated by discharge from the nozzle and reflection of the discharge from the bottom surface; the agitation generally has cylindrical symmetry due to the shape of the reservoir and location of the nozzle. FIG. 2 shows an isolated view of nozzle 70. Solution 81 (schematically illustrated in FIG. 2) flowing from line 62 enters the valve at inlet port 75; discharge solution flow 82 is directed downward from nozzle outlet port 76. The nozzle has ports 77 that create a venturi effect and thereby draw the solution back into the nozzle, as shown schematically by arrows 83.

In this embodiment, reservoir 10, line 22, pump 51, lines 60 and 62, and nozzle 70 form a closed loop recirculation system effective to turn over (that is, fully recirculate) the volume of solution in the reservoir approximately every 2.5 minutes. This ensures that insoluble particles remain suspended in the solution. In localities with harsh water chemistry (that is, water that has greater than 150 ppm alkalinity and greater than 5 ppm silicates), the system is also effective to suspend particles of aggregate produced by reaction with calcium.

The solution is drawn out of the reservoir through an outlet valve 71 installed in the sidewall 11, as shown in FIG. 1. A line 72 leads to a chemical feed pump (not shown) that injects the solution into the water flow where treatment is desired.

In an embodiment, the chemical solution is an available chlorine solution with a concentration of available chlorine generally in the range of 0.1% to 25%, preferably 0.1% to 20%, or more preferably 0.1% to 12%. In two specific embodiments, the chemical solution is a solution of calcium hypochlorite having a concentration of available chlorine in the ranges of 0.1% to 12% and 0.1% to 0.9% respectively.

It is noteworthy that system 1 in the above-described embodiment is external to the chemical feed pump and is easily accessible for maintenance and repair. The centrifugal pump 51 and the mixing nozzle 70 do not require any critical tolerances for operation. In particular, mixing of the solution and suspension of insoluble particles is accomplished in reservoir 10 without any moving parts. The system is therefore suitable for continuous operation.

While the disclosure has been described in terms of a specific embodiment, it is evident in view of the foregoing description that numerous alternatives, modifications and variations will be apparent to those skilled in the art. Accordingly, the disclosure is intended to encompass all such alternatives, modifications and variations which fall within the scope and spirit of the disclosure and the following claims.

We claim:

1. An apparatus, comprising:
    a reservoir for holding a chemical solution, the reservoir having an upper portion, a lower portion, a bottom and a sidewall;
    a pump for circulating the chemical solution, the pump having an inlet and an outlet, the inlet and the outlet connected to the reservoir by a pump inlet line and a pump discharge line respectively; and
    a discharge nozzle disposed in the lower portion of the reservoir for discharging the solution toward the bottom of the reservoir, the discharge nozzle having an inlet port connected by a nozzle inlet line to the pump discharge line through the sidewall of the reservoir and an outlet port, the reservoir, the pump, the pump inlet line, the pump discharge line, the nozzle inlet line and the nozzle forming a closed loop recirculation system effective to suspend insoluble material in the chemical solution,
    wherein the pump inlet line is connected to the sidewall of the reservoir at a location below a normal surface level of the solution, and the pump discharge line is connected to the sidewall of the reservoir above said location and above said nozzle, and wherein the discharge nozzle includes venturi ports located at a position intermediate the inlet port and the outlet port creating a venturi effect to draw solution back into the nozzle.

2. The apparatus according to claim 1, wherein the system is effective to turn over the solution in the reservoir approximately every 2.5 minutes.

3. The apparatus according to claim 1, wherein the nozzle is disposed approximately along a vertical centerline of the reservoir, the nozzle thereby being effective to discharge the chemical solution vertically toward the bottom of the reservoir.

4. The apparatus according to claim 1, wherein the chemical solution is a solution of calcium hypochlorite having a concentration of available chlorine in the range of 0.1% to 12%.

5. The apparatus according to claim 4, wherein the chemical solution is a solution of calcium hypochlorite having a concentration of available chlorine in the range of 0.1% to 0.9%.

6. The apparatus according to claim 4, wherein the chemical solution further comprises at least one of calcium carbonate and calcium hydroxide.

7. The apparatus according to claim 1, wherein the chemical solution is formed using water characterized as having harsh water chemistry, the water having greater than 150 ppm alkalinity and greater than 5 ppm silicates, and the apparatus is effective to suspend particles of aggregate formed from a reaction due to the harsh water chemistry.

8. The apparatus according to claim 2, wherein the reservoir comprises a grid having openings therein, the sprayer is disposed beneath the grid, and the sprayer sprays water upward through said openings onto the chemical product.

9. The apparatus according to claim 1, further comprising an outlet valve installed in the sidewall of the reservoir, the outlet valve connected to an external chemical feed pump.

10. A method, comprising:
    forming a chemical solution in a reservoir;
    pumping the chemical solution from the reservoir through a pump inlet line and back to the reservoir through a pump discharge line; and
    discharging the solution toward a bottom of the reservoir through a discharge nozzle having an inlet port and an outlet port, the inlet port is connected by a nozzle inlet line to the pump discharge line through a sidewall of the reservoir, thereby recirculating the chemical solution in a closed loop to suspend insoluble material in the chemical solution,
    wherein the pump inlet line is connected to the sidewall of the reservoir at a location below a normal surface level of the solution, and the pump discharge line is connected to the sidewall of the reservoir above said location and above said nozzle, and wherein the discharge nozzle includes venturi ports located at a position intermediate the inlet port and the outlet port creating a venturi effect to draw solution back into the nozzle.

11. The method according to claim 10, wherein the chemical solution is turned over approximately every 2.5 minutes.

12. The method according to claim 10, wherein the nozzle is disposed approximately along a vertical centerline of the reservoir, and the nozzle discharges the chemical solution vertically toward the bottom of the reservoir.

13. The method according to claim 10, wherein the chemical solution is a solution of calcium hypochlorite having a concentration of available chlorine in the range of 0.1% to 12%.

14. The method according to claim 13, wherein the chemical solution is a solution of calcium hypochlorite having a concentration of available chlorine in the range of 0.1% to 0.9%.

15. The method according to claim 13, wherein the chemical solution further comprises at least one of calcium carbonate and calcium hydroxide.

16. The method according to claim 10, wherein the chemical solution is formed using water characterized as having harsh water chemistry, the water having greater than 150 ppm alkalinity and greater than 5 ppm silicates, and the apparatus is effective to suspend particles of aggregate formed from a reaction due to the harsh water chemistry.

17. The method according to claim 11, wherein the reservoir comprises a grid having openings therein, and said spraying is performed upward through said openings onto the chemical product.

18. The method according to claim 10, further comprising: connecting an outlet valve to the sidewall of the reservoir, and connecting the outlet valve to an external chemical feed pump.

\* \* \* \* \*

UNITED STATES PATENT AND TRADEMARK OFFICE
CERTIFICATE OF CORRECTION

PATENT NO. : 8,372,348 B2
APPLICATION NO. : 12/490044
DATED : February 12, 2013
INVENTOR(S) : Zachary Harris Adams et al.

It is certified that error appears in the above-identified patent and that said Letters Patent is hereby corrected as shown below:

At item (60) on the Title page of the patent, the filing date should appear as follows:

(60) Provisional application No. 61/076,989, filed on Jun. 30, 2008.

Signed and Sealed this
Second Day of July, 2013

Teresa Stanek Rea
*Acting Director of the United States Patent and Trademark Office*